United States Patent
Nusier et al.

(10) Patent No.: US 10,737,592 B2
(45) Date of Patent: Aug. 11, 2020

(54) SEAT BACK ROTATION LIMITER

(71) Applicant: Ford Global Technologies, LLC, Dearborn, MI (US)

(72) Inventors: Saied Nusier, Canton, MI (US); Mohamed Ridha Baccouche, Ann Arbor, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 15/992,927

(22) Filed: May 30, 2018

(65) Prior Publication Data

US 2019/0366884 A1 Dec. 5, 2019

(51) Int. Cl.
*B60N 2/22* (2006.01)
*B60N 2/20* (2006.01)
*B60N 2/06* (2006.01)
*B60N 2/42* (2006.01)

(52) U.S. Cl.
CPC ............. *B60N 2/2227* (2013.01); *B60N 2/06* (2013.01); *B60N 2/20* (2013.01); *B60N 2/4221* (2013.01); *B60N 2/4228* (2013.01)

(58) Field of Classification Search
CPC .......... B60N 2/2227; B60N 2/20; B60N 2/06; B60N 2/4221; B60N 2/4228; B60N 2/68; B60N 2/64; B60N 2/42745; B60N 2/22; A47C 1/027
USPC ................................. 297/452.61, 374, 270.1
See application file for complete search history.

(56) References Cited

U.S. PATENT DOCUMENTS

| | | | |
|---|---|---|---|
| 6,209,955 B1 | 4/2001 | Seibold | |
| 6,353,970 B1 * | 3/2002 | Spaeth | B60N 2/20 16/360 |
| 6,786,543 B2 | 9/2004 | Andersson et al. | |
| 7,059,675 B2 | 6/2006 | Nelson et al. | |
| 7,237,839 B2 | 7/2007 | Aufrere et al. | |
| 7,566,099 B2 * | 7/2009 | Catanzarite | A47C 1/025 297/361.1 |
| 8,794,704 B2 * | 8/2014 | Chen | B60N 2/68 297/354.1 |
| 2009/0146483 A1 * | 6/2009 | Niwa | B60N 2/58 297/452.61 |
| 2010/0026073 A1 * | 2/2010 | Bruck | B60N 2/0232 297/378.1 |

FOREIGN PATENT DOCUMENTS

| | | | | |
|---|---|---|---|---|
| DE | 102006021895 A | * | 11/2007 | ........... B60N 2/2227 |
| GB | 2494222 A | | 3/2013 | |
| KR | 20040107646 A | | 12/2004 | |

* cited by examiner

*Primary Examiner* — Milton Nelson, Jr.
(74) *Attorney, Agent, or Firm* — Frank A. MacKenzie; Bejin Bieneman PLC (57) ABSTRACT

A seat includes a seat-bottom frame, a seat-back frame rotatable relative to the seat-bottom frame between a forward position and a rearward position, and a first wedge and a second wedge on opposite side of the seat-back frame. The first wedge extends from the seat-back frame in the forward position to the seat-bottom frame, and the second wedge extends from the seat-back frame in the rearward position to the seat-bottom frame.

17 Claims, 8 Drawing Sheets

SEAT BACK ROTATION LIMITER

BACKGROUND

A passenger cabin of a vehicle includes one or more front seats disposed at a front of the passenger cabin and one or more back seats disposed behind the front seats. The passenger cabin may also include third-row seats at a rear of the passenger cabin. The seats each include a seat back, a seat bottom, and a head restraint. The head restraint is supported by the seat back and may be stationary or movable relative to the seat back. The seat back is supported by the seat bottom and may be stationary or movable relative to the seat bottom. The seat back, the seat bottom, and/or the head restraint may be adjustable in multiple degrees of freedom.

DETAILED DESCRIPTION

A seat includes a seat-bottom frame, a seat-back frame rotatable relative to the seat-bottom frame between a forward position and a rearward position, and a first wedge and a second wedge on opposite side of the seat-back frame. The first wedge extends from the seat-back frame in the forward position to the seat-bottom frame, and the second wedge extends from the seat-back frame in the rearward position to the seat-bottom frame.

A rotational range of the seat-back frame from the rearward position to the forward position may be no more than 60°.

The first and second wedges may be a first material, the seat-bottom and seat-back frames may be a second material, and a yield strength of the first material may be at least as high as a yield strength of the second material.

The seat may further include a hinge connecting the seat-bottom frame and the seat-back frame, and the first and second wedges may be aligned in a seat-forward direction with the hinge.

The seat-back frame may include a side beam elongated from the seat-bottom frame, and the first and second wedges are wider in a cross-seat direction than the side beam.

The seat-bottom frame may include a side beam elongated from the seat-back frame, and the first and second wedges may be wider in a cross-seat direction than the side beam.

The first and second wedges may be fixed relative to the seat-bottom frame.

The first and second wedges may be integral with the seat-bottom frame.

The first and second wedges may be welded to the seat-bottom frame.

The first and second wedge may be fixed relative to the seat-back frame.

The seat may further include a plurality of upholstery panels covering the seat-back frame and the seat-bottom frame, and the upholstery panels may conceal the first and second wedges. The seat may further include cushioning extending between the upholstery panels and first and second wedges.

The seat-bottom frame may include a seat-track bracket and a seatpan coupled to the seat-track bracket, and the seat-back frame may be hingedly coupled to the seat-track bracket. The seatpan may be adjustable relative to the seat-track bracket.

The first wedge may be fixedly attached to the seat-track bracket.

The second wedge may be fixedly attached to the seat-track bracket.

With reference to the Figures, a seat 30 for a vehicle 32 includes a seat-bottom frame 34, a seat-back frame 36 rotatable relative to the seat-bottom frame 34 between a forward position and a rearward position, and a first wedge 38 and a second wedge 40 on opposite side of the seat-back frame. (The adjectives "first" and "second" are used throughout this document as identifiers and are not intended to signify importance or order.) The first wedge 38 extends from the seat-back frame 36 in the forward position to the seat-bottom frame 34, and the second wedge 40 extends from the seat-back frame 36 in the rearward position to the seat-bottom frame 34.

The seat 30, in particular the wedges 38, 40, minimizes rotation of the seat-back frame 36 in both frontal and rear impacts. In the case of a frontal impact, the seat 30 can stabilize an airbag 42 mounted to a seat back 44 of the seat 30 for occupants seated behind the seat 30. Also in the case of a frontal impact, the seat 30 can minimize forward rotation of the seat back 44 due to cargo impacting the seat back 44 during a frontal impact, which may reduce the forces on an occupant of the seat 30. In the case of a rear impact, the seat 30 can reduce a likelihood of the seat back 44 contacting an occupant seated behind the seat 30. The seat 30 can minimize whiplash for an occupant of the seat 30.

Figure 1:
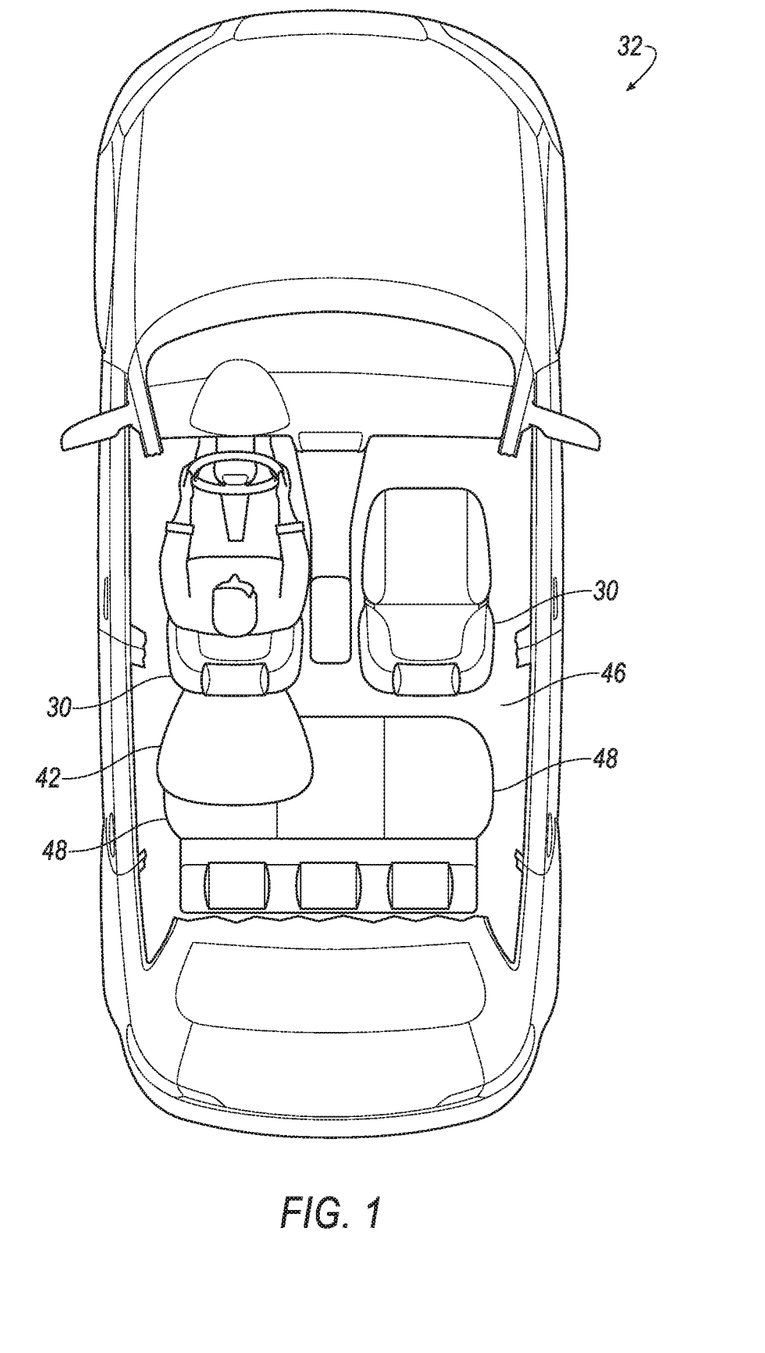
FIG. 1 is a top view of a vehicle including a passenger cabin exposed for illustration.

With reference to FIG. 1, the vehicle 32 includes a passenger cabin 46 to house occupants, if any, of the vehicle 32. The passenger cabin 46 includes a plurality of seats 30, 48 including the seat 30. The plurality of seats 30, 48 may include trailing seats 48. For the purposes of this disclosure, a "trailing seat" is a seat disposed immediately behind the seat 30. For example, the seat 30 may be a front seat, and the trailing seat 48 may be a back seat, as shown in FIG. 1. The passenger cabin 46 may also include third-row seats (not shown) at a rear of the passenger cabin 46, in which case the seat 30 may be a second-row seat and the trailing seat 48 may be a third-row seat.

Figure 2:
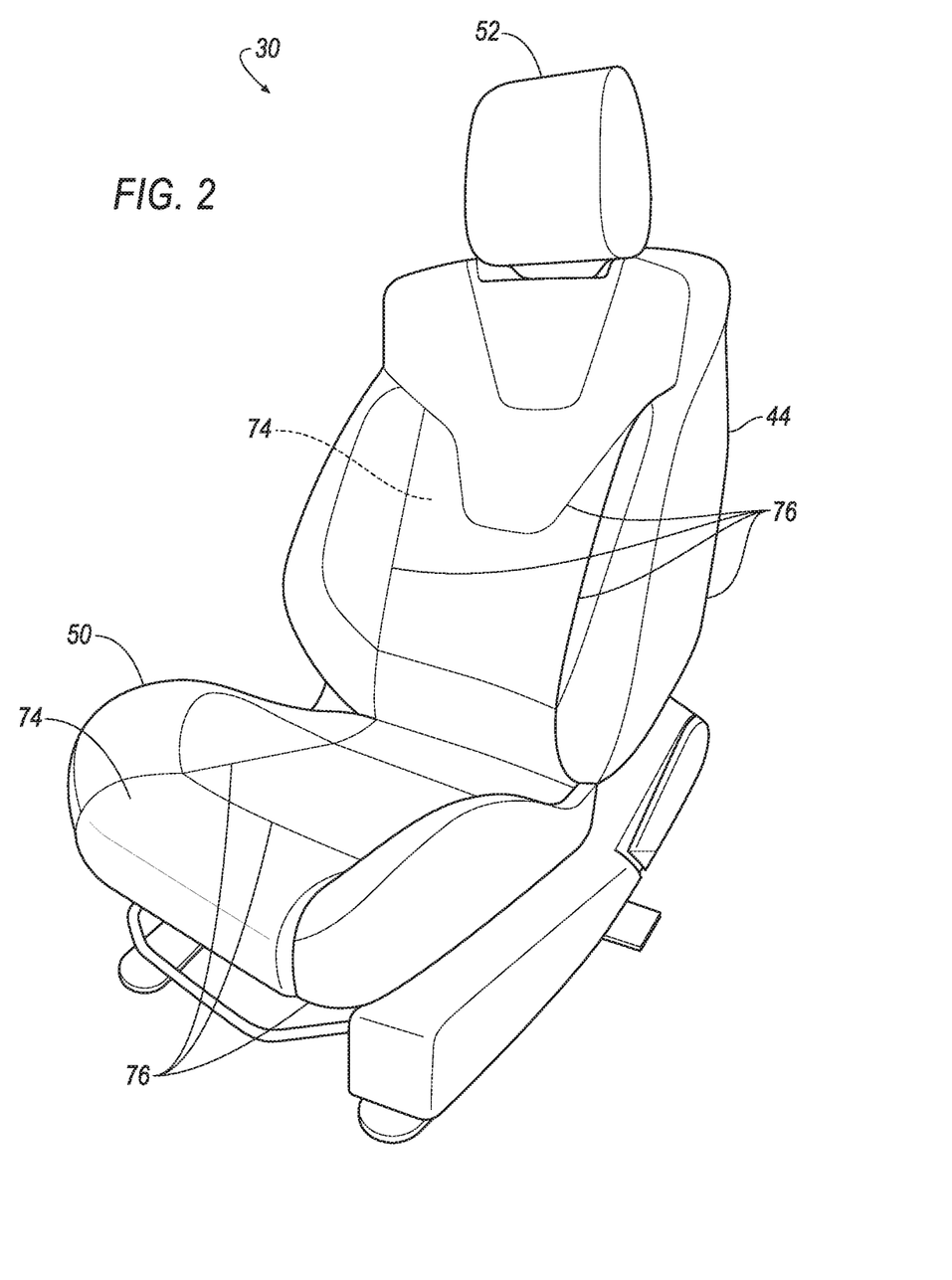
FIG. 2 is a perspective view of a seat of the vehicle of FIG. 1.

With reference to FIG. 2, the seat 30 may include a seat back 44, a seat bottom 50, and a head restraint 52. The head restraint 52 may be supported by the seat back 44 and may be stationary or movable relative to the seat back 44. The seat back 44 may be supported by the seat bottom 50 and may be stationary or movable relative to the seat bottom 50. The seat back 44, the seat bottom 50, and/or the head restraint 52 may be adjustable in multiple degrees of freedom. Specifically, the seat back 44, the seat bottom 50, and/or the head restraint 52 may themselves be adjustable, in other words, adjustable components within the seat back 44, the seat bottom 50, and/or the head restraint 52, and/or may be adjustable relative to each other.

With reference to FIGS. 3, 4, 6, and 7, the seat 30 includes a seat frame 54. The seat frame 54 may include panels and/or may include tubes, beams, etc. The seat frame 54 may be formed of any suitable metal, e.g., steel or aluminum. Alternatively or additionally, some or all components of the seat frame 54 may be formed of a suitable plastic material, e.g., carbon fiber reinforced plastic (CFRP), glass fiber-reinforced semi-finished thermoplastic composite (organo sheet), etc.

The seat frame 54 includes the seat-bottom frame 34. The seat-bottom frame 34 includes a seat-track bracket 56 and a seatpan 58. The seat-track bracket 56 is slidable forward and backward along tracks 60. (Relative directional terms such as "forward," "backward," etc. describe a describe a direction relative to the seat 30, e.g., forward is the direction that the seat 30 is facing.) The seatpan 58 is positioned and shaped for an occupant to sit on the seatpan 58. The seatpan 58 is coupled to the seat-track bracket 56. The seatpan 58 is adjustable relative to the seat-track bracket 56; i.e., an occupant can change a position of the seatpan 58 relative to the seat-track bracket 56.

Figure 3:
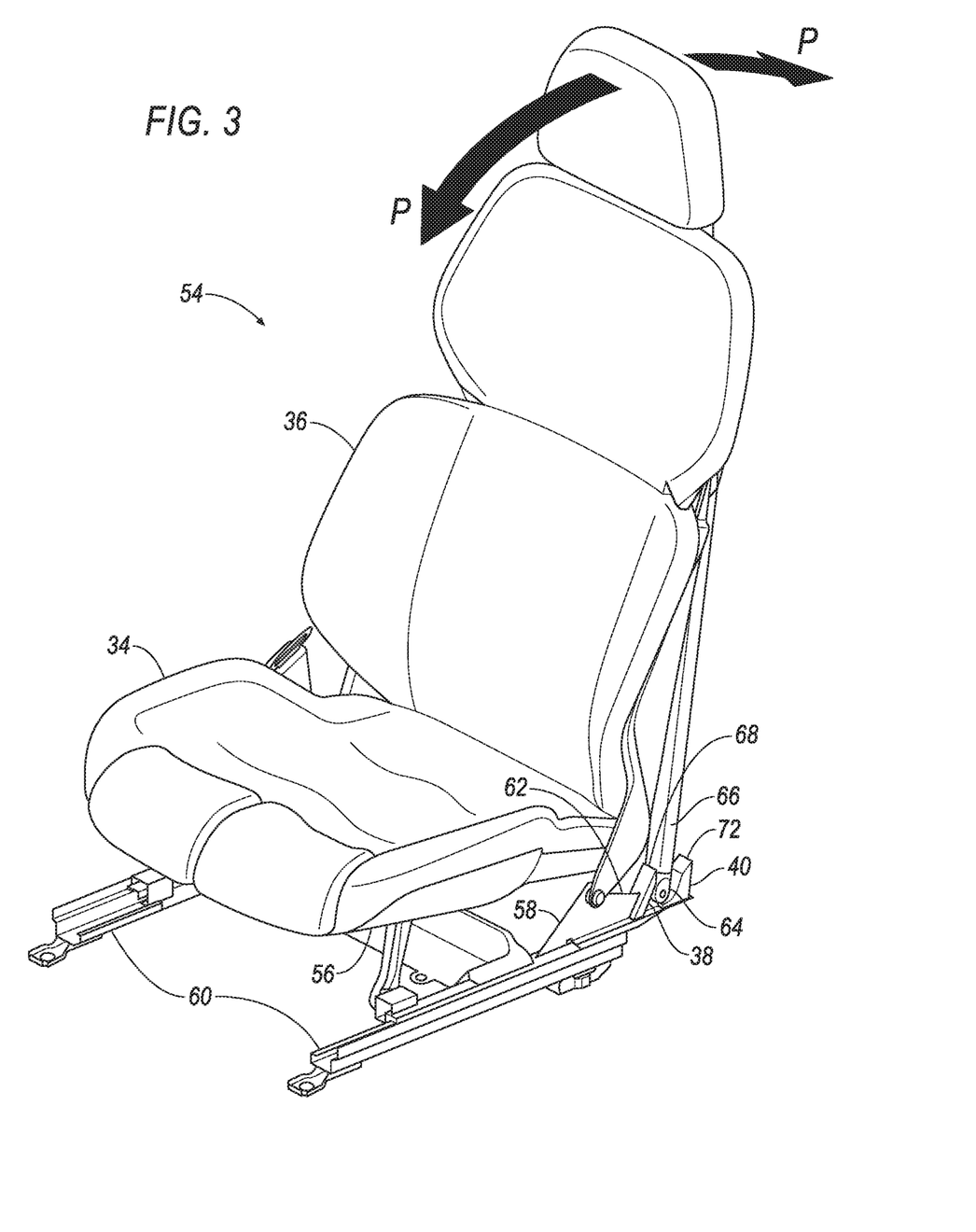
FIG. 3 is a perspective view of a seat frame of the seat of FIG. 2 with wedges in first positions.
Figure 6:
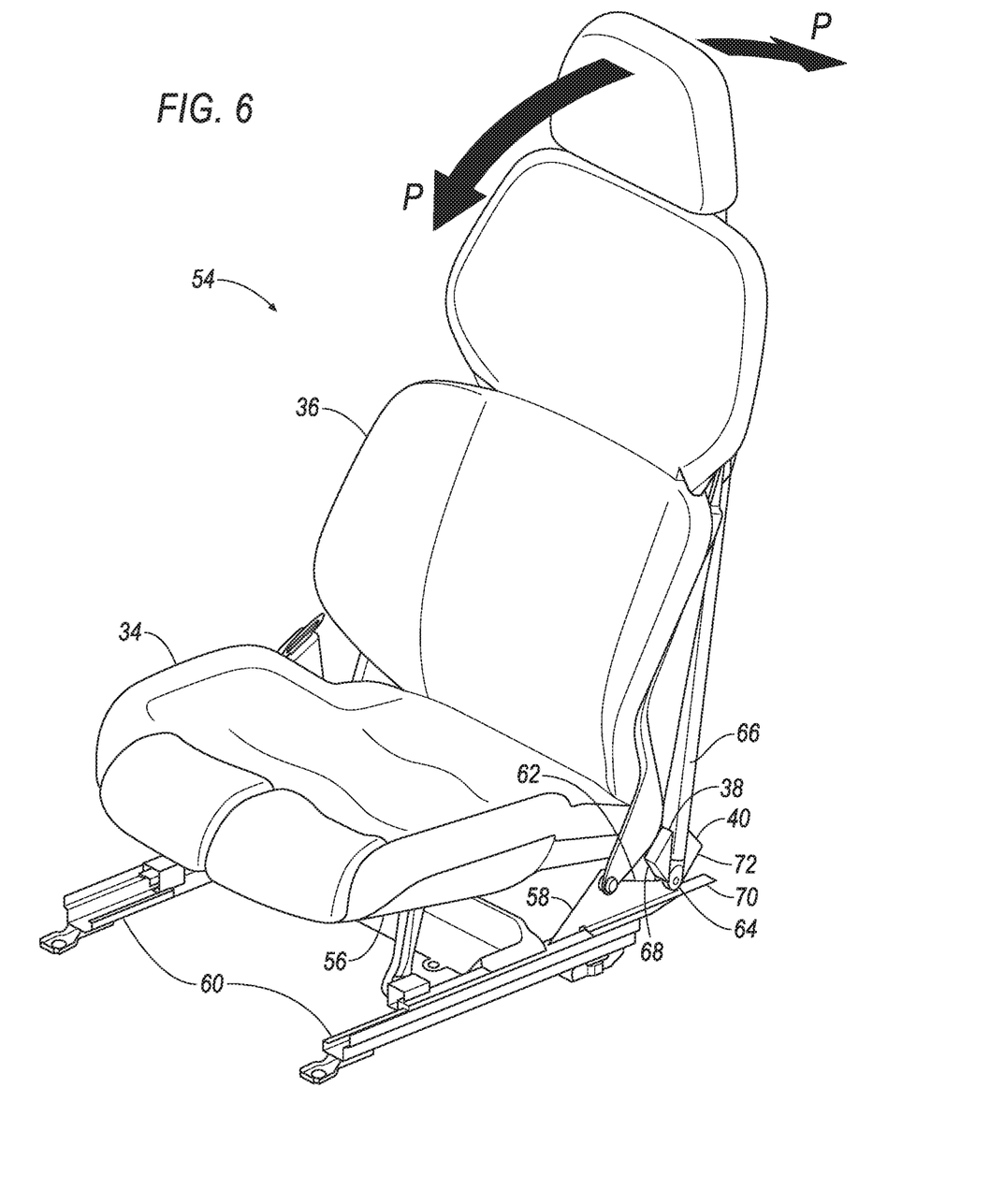
FIG. 6 is a perspective view of the seat frame of the seat of FIG. 2 with the wedges in second positions.

The seat-bottom frame 34 includes first side beams 62. The first side beams 62 are elongated forward from the seat-back frame 36, specifically from hinges 64 of the seat frame 54 to which the seat-back frame 36 is coupled. The first side beams 62 are elongated radially from the hinges 64. The first side beams 62 may be at opposing lateral, i.e., cross-seat, sides of the seat-bottom frame 34. The first side beams 62 may be part of the seat-track bracket 56 or part of the seatpan 58; as shown in FIGS. 3 and 6, the first side beams 62 are part of the seat-track bracket 56.

The seat-back frame 36 is rotatable relative to the seat-bottom frame 34. The hinges 64 connects the seat-bottom frame 34 and the seat-back frame 36. Specifically, the seat-back frame 36 may be hingedly coupled to the seat-track bracket 56 via the hinges 64. The seat-back frame 36 is rotatable relative to the seat-bottom frame 34 along an angular path P including a neutral position. The neutral position is an arbitrary position chosen as a reference point. The neutral position is a position where an occupant may position the seat-back frame 36 during normal use of the seat 30. The angular path P is a path followed by rotating the seat-back frame 36 about the hinges 64 forward and backward from the neutral position.

The seat-back frame 36 is positioned and shaped for an occupant to lean their back against the seat-back frame 36 while sitting on the seatpan 58. In the neutral position, the seat-back frame 36 extends mostly upward and slightly backward from the hinges 64. The seat-back frame 36 includes second side beams 66 elongated from the seat-bottom frame 34, specifically, from the hinges 64 to which the seat-bottom frame 34 is coupled. The second side beams 66 are elongated radially from the hinge 64. The second side beams 66 may be at opposing lateral, i.e., cross-seat, sides of the seat-back frame 36.

Figure 5:
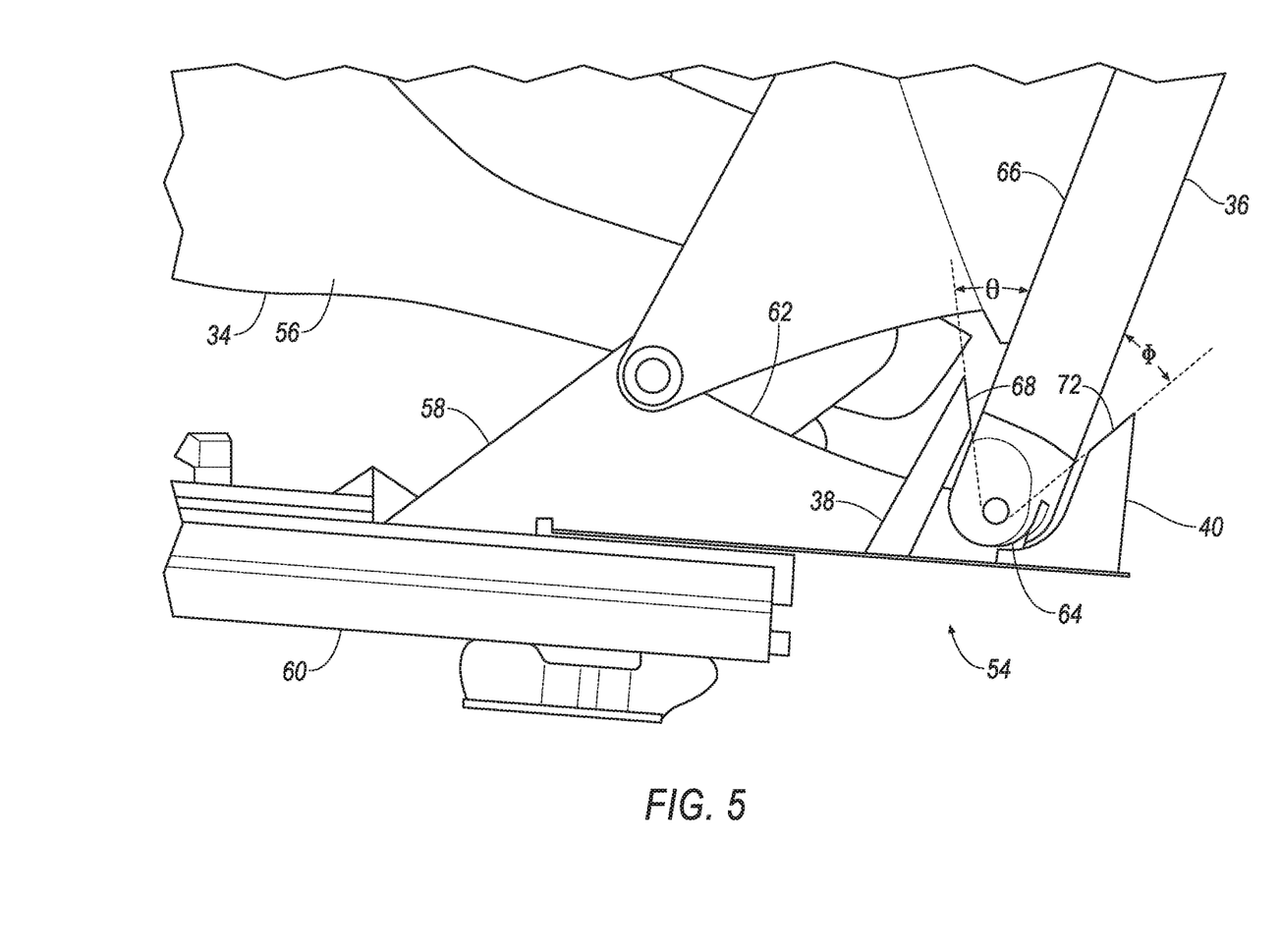
FIG. 5 is a side view of a portion of the seat frame of the seat of FIG. 2 with the wedges in the first positions.
Figure 8:
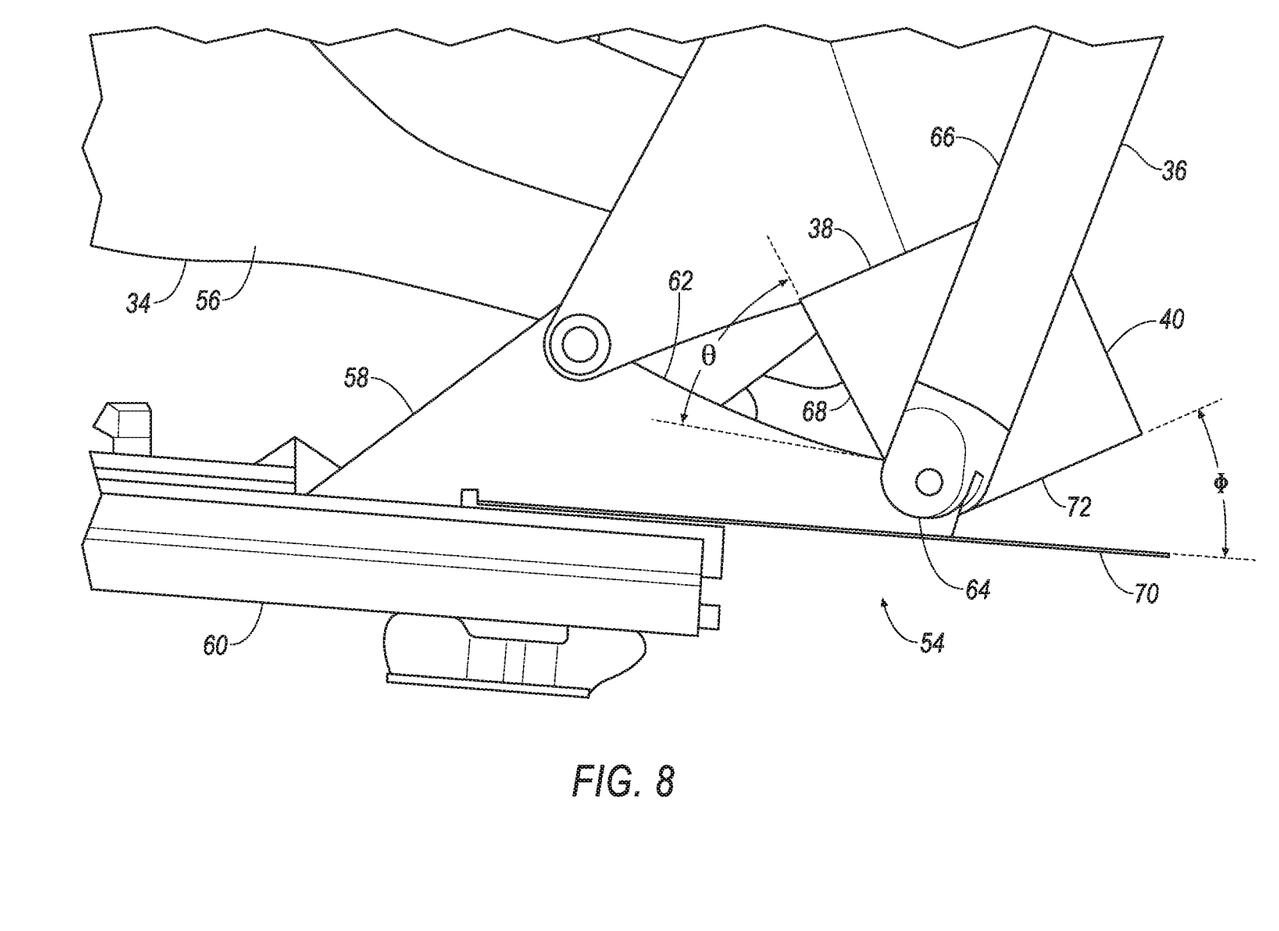
FIG. 8 is a side view of a portion of the seat frame of the seat of FIG. 2 with the wedges in the second position.

With reference to FIGS. 5 and 8, the first wedge 38 is fixed relative to one of the seat-bottom frame 34 and the seat-back frame 36. For the purposes of this disclosure, "fixed relative to" is defined as moving together as a unit. For example, the first wedge 38 is fixed relative to the seat-bottom frame 34 and is thus stationary while the seat-back frame 36 rotates relative to the seat-bottom frame 34, as shown in FIG. 5. For an alternative example, the first wedge 38 is fixed relative to the seat-back frame 36 and thus rotates with the seat-back frame 36 relative to the seat-bottom frame 34, as shown in FIG. 8.

The seat 30 may include two first wedges 38. The first wedges 38 may be at opposing lateral, i.e., cross-seat sides of the seat frame 54. The first wedges 38 may be laterally symmetrical with respect to the seat 30. Each first wedge 38 may be aligned in a seat-forward direction with one of the hinges 64; i.e., on each lateral side of the seat 30, a plane extending vertically and forward relative to the seat 30 includes both the hinge 64 and the first wedge 38.

Each first wedge 38 is attached to one of the first side beams 62 or the second side beams 66. The first wedge 38 may be attached to the seat-bottom frame 34, e.g., fixedly attached to the seat-track bracket 56, as shown in FIG. 5. For example, the first wedge 38 may be integral with the seat-bottom frame 34, e.g., the seat-track bracket 56. For the purposes of this disclosure, "integral" is defined as made of a single, uniform piece of material with no seams, joints, fasteners, or adhesives holding it together. For another example, the first wedge 38 may be welded to the seat-bottom frame 34, e.g., the seat-track bracket 56. Alternatively, the first wedge 38 may be integral with or welded to the seat-back frame 36, as shown in FIG. 8.

The first wedge 38 occupies all but a first angle $\theta$ along the angular path P forward from the neutral position of the seat-back frame 36 to the seat-bottom frame 34. In other words, the seat-back frame 36 is able to rotate forward from the neutral position by the first angle $\theta$ to the forward position before the first wedge 38 is contacting both the seat-bottom frame 34 and the seat-back frame 36, e.g., both one of the first side beams 62 and one of the second side beams 66, preventing further forward rotation. When the seat-back frame 36 is in the forward position, the first wedge 38 is either contacting or attached to both the seat-bottom frame 34 and the seat-back frame 36 and thus extends from the seat-back frame 36 to the seat-bottom frame 34. The first angle $\theta$ may be no more than 30°, e.g., may be 20°, to permit the occupant to rotate the seat-back frame 36 for comfort while limiting the extent of the rotation to reduce a likelihood or severity of injury during an impact.

The first wedge 38 includes a first contact surface 68 positioned to contact whichever of the seat-bottom frame 34 and the seat-back frame 36 that the first wedge 38 is not attached to if the seat-back frame 36 rotates forward from the neutral position by the first angle $\theta$. The first contact surface 68 extends in a cross-seat direction and in a radial direction relative to the hinge 64. The first wedge 38, e.g., the first contact surface 68, may be wider in a cross-seat direction than the first side beam 62 and/or the second side beam 66, as shown in FIGS. 3 and 6.

The first wedge 38 is a first material, and at least one of the seat-bottom frame 34 and the seat-back frame 36 are made a second material different from the first material. The yield strength of the first material is at least as high as, and may be higher than, a yield strength of the second material. For example, the first material may be steel, and the second material may be extruded aluminum.

The second wedge 40 is fixed relative to one of the seat-bottom frame 34 and the seat-back frame 36. For example, the second wedge 40 is fixed relative to the seat-bottom frame 34 and is thus stationary while the seat-back frame 36 rotates relative to the seat-bottom frame 34, as shown in FIG. 5. For an alternative example, the second wedge 40 is fixed relative to the seat-back frame 36 and thus rotates with the seat-back frame 36 relative to the seat-bottom frame 34, as shown in FIG. 8.

The seat may include two second wedges 40. The second wedges 40 may be at opposing lateral, i.e., cross-seat sides of the seat frame 54. The second wedges 40 may be laterally symmetrical with respect to the seat 30. Each second wedge 40 may be aligned in a seat-forward direction with one of the hinges 64; i.e., on each lateral side of the seat 30, a plane extending vertically and forward relative to the seat 30 includes both the hinge 64 and the second wedge 40.

Each second wedge 40 may be cantilevered rearward from the hinge 64 as part of the seat-track bracket 56 or may be attached to one of the second side beams 66. The second wedge 40 may be attached to the seat-bottom frame 34, e.g., fixedly attached to the seat-track bracket 56, as shown in FIG. 5. For example, the second wedge 40 may be integral with the seat-bottom frame 34, e.g., the seat-track bracket 56. For another example, the second wedge 40 may be welded to the seat-bottom frame 34, e.g., the seat-track bracket 56. Alternatively, the second wedge 40 may be integral with or welded to the seat-back frame 36, as shown in FIG. 8, in which case the seat-track bracket 56 may include a contact plate 70 cantilevered rearward from the hinge 64.

The second wedge 40 occupies all but a second angle φ along the angular path P backward from the neutral position of the seat-back frame 36 to the seat-bottom frame 34. In other words, the seat-back frame 36 is able to rotate backward from the neutral position by the second angle φ to the rearward position before the second wedge 40 is contacting both the seat-bottom frame 34 and the seat-back frame 36, e.g., one of the second side beams 66, preventing further backward rotation. When the seat-back frame 36 is in the rearward position, the second wedge 40 is either contacting or attached to both the seat-bottom frame 34 and the seat-back frame 36 and thus extends from the seat-back frame 36 to the seat-bottom frame 34. The second angle φ may be no more than 30°, e.g., may be 20°, to permit the occupant to rotate the seat-back frame 36 for comfort while limiting the extent of the rotation to reduce a likelihood or severity of injury during an impact. The seat-back frame 36 has a rotational range from the rearward position to the forward position that is a sum of first angle θ and the second angle φ. The rotational range of the seat-back frame may be no more than 60°.

The second wedge 40 includes a second contact surface 72 positioned to contact whichever of the seat-bottom frame 34 and the seat-back frame 36 that the second wedge 40 is not attached to if the seat-back frame 36 rotates backward from the neutral position by the second angle cp. The second contact surface 72 extends in a cross-seat direction and in a radial direction relative to the hinge 64. The second wedge 40, e.g., the second contact surface 72, may be wider in a cross-seat direction than the first side beam 62 and/or the second side beam 66, as shown in FIGS. 3 and 6.

The second wedge 40 is a first material, e.g., the same material as the first wedge 38, and at least one of the seat-bottom frame 34 and the seat-back frame 36 are made a second material different from the first material. The yield strength of the first material is at least as high as, and may be higher than, a yield strength of the second material. For example, the first material may be steel, and the second material may be extruded aluminum.

Returning to FIG. 2, the seat bottom 50 and the seat back 44 include cushioning 74 and a plurality of upholstery panels 76. The upholstery panels 76 cover the seat-back frame 36 and the seat-bottom frame 34. The upholstery panels 76 may conceal the first and second wedges 38, 40. The cushioning 74 extends between the upholstery panels 76 and the seat frame 54, e.g., between the upholstery panels 76 and the first and second wedges 38, 40. The cushioning 74 may be foam or any other suitable supportive material. The upholstery panels 76 may be formed of cloth, leather, faux leather, or any other suitable material. The upholstery panels 76 may be stitched in place around the foam.

Figure 4:
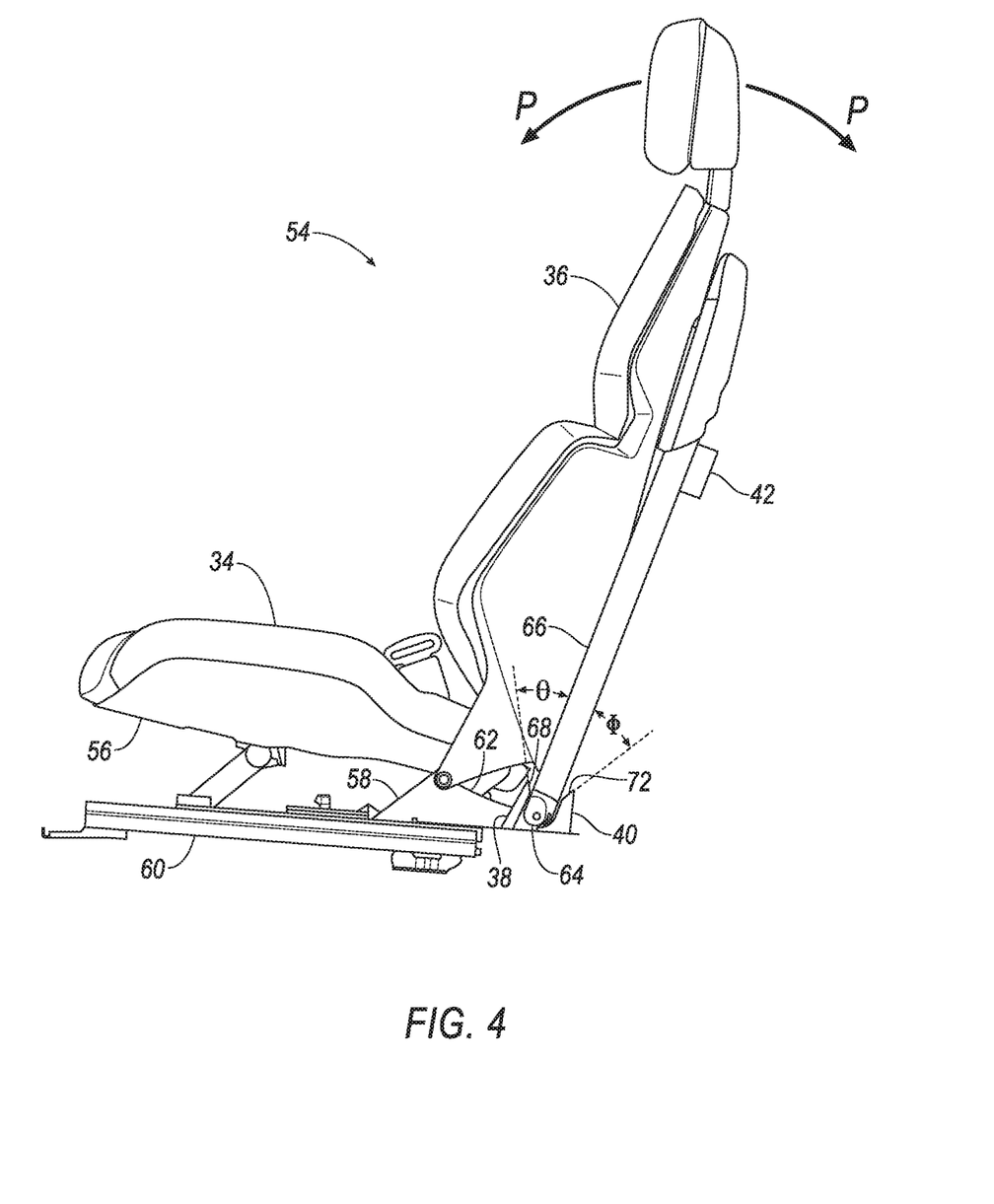
FIG. 4 is a side view of the seat frame of the seat of FIG. 2 with the wedges in the first positions.
Figure 7:
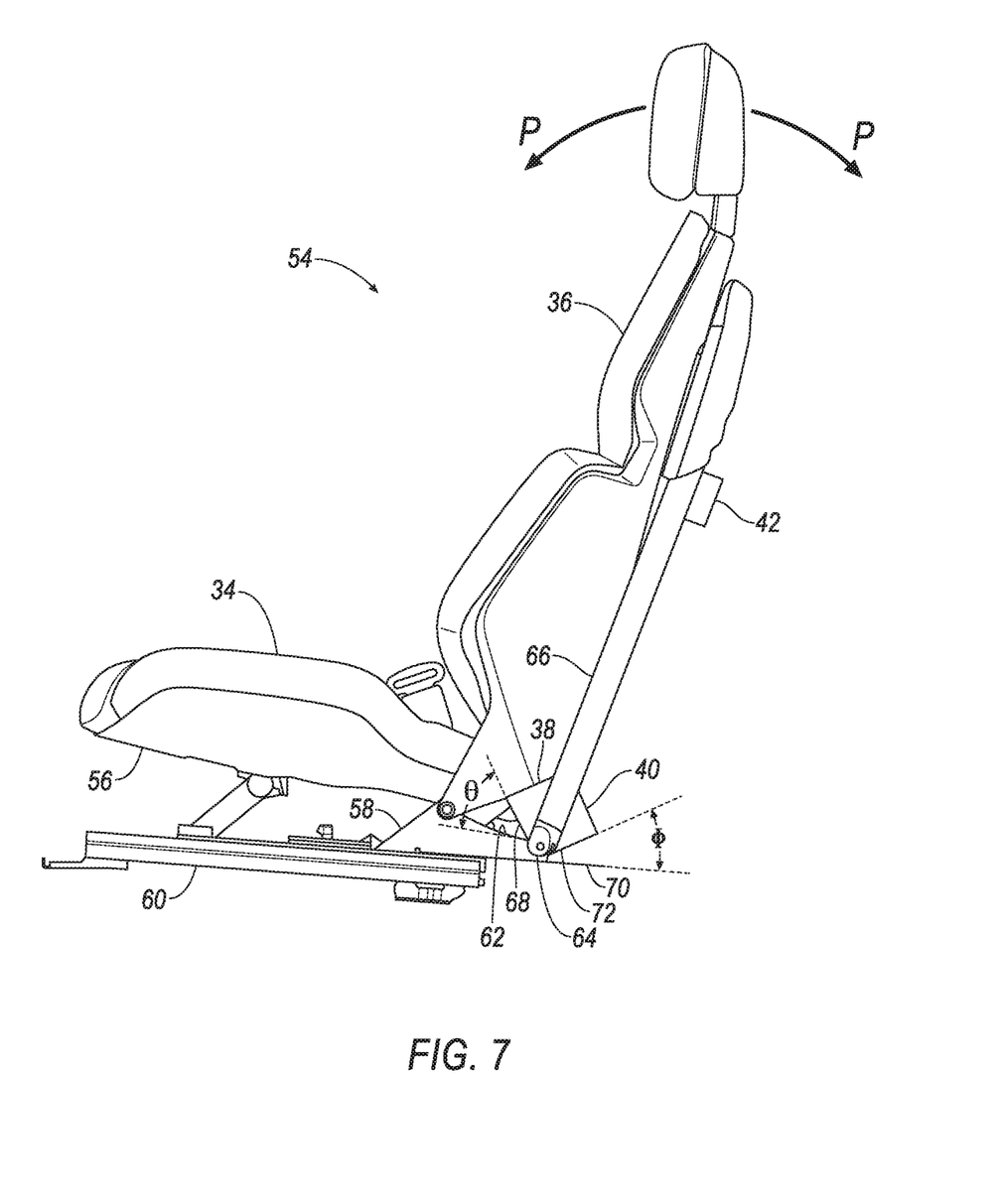
FIG. 7 is a side view of the seat frame of the seat of FIG. 2 with the wedges in the second positions.

Returning to FIG. 1, the airbag 42 is mounted to the seat-back frame 36 and positioned to inflate rearward relative to the seat 30. The airbag 42 is inflatable from an uninflated position, as shown in FIGS. 4 and 7, to an inflated position, as shown in FIG. 1. The airbag 42 in the inflated position can cushion an occupant of the trailing seat 48 during a frontal impact. The airbag 42 may be formed of any suitable airbag material, for example, a woven polymer. For example, the airbag 42 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

In the event of a frontal impact to the vehicle 32 including the seat 30, the momentum of the occupant sitting in the seat 30 and of the seat back 44 cause the seat back 44 to rotate forward. The first wedge 38 can limit the rotation of the seat-back frame 36 forward to the forward position. Depending on the speed and direction of the impact, the airbag 42 may inflate. The limited rotation of the seat back 44 can keep the location of the airbag 42 more stable, so the airbag 42 is in a better position for an occupant of the trailing seat 48. The symmetrical arrangement of the first wedges 38 can prevent the seat-back frame 36 from twisting.

In the event of a rear impact to the vehicle 32 including the seat 30, the momentum of the occupant sitting in the seat 30 and of the seat back 44 cause the seat back 44 to rotate backward. The second wedge 40 can limit the rotation of the seat-back frame 36 backward to the rearward position. The limited rotation can reduce whiplash for an occupant of the seat 30. The symmetrical arrangement of the second wedges 40 can prevent the seat-back frame 36 from twisting.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat comprising:
   a seat-bottom frame;
   a seat-back frame rotatable relative to the seat-bottom frame between a forward position and a rearward position; and
   a first wedge and a second wedge on opposite sides of the seat-back frame, the first wedge extending from the seat-back frame in the forward position to the seat-bottom frame, and the second wedge extending from the seat-back frame in the rearward position to the seat-bottom frame;
   wherein the seat-bottom frame includes a seat-track bracket and a seatpan coupled to the seat-track bracket, and the seat-back frame is hingedly coupled to the seat-track bracket.

2. The seat of claim 1, wherein a rotational range of the seat-back frame from the rearward position to the forward position is no more than 60°.

3. The seat of claim 1, wherein the first and second wedges are a first material, the seat-bottom and seat-back frames are a second material, and a yield strength of the first material is at least as high as a yield strength of the second material.

4. The seat of claim 1, further comprising a hinge connecting the seat-bottom frame and the seat-back frame, and the first and second wedges are aligned in a seat-forward direction with the hinge.

5. The seat of claim 1, wherein the seat-back frame includes a side beam elongated from the seat-bottom frame, and the first and second wedges are wider in a cross-seat direction than the side beam.

6. The seat of claim 1, wherein the seat-bottom frame includes a side beam elongated from the seat-back frame, and the first and second wedges are wider in a cross-seat direction than the side beam.

7. The seat of claim 1, wherein the first and second wedges are fixed relative to the seat-bottom frame.

8. The seat of claim 1, wherein the first and second wedges are integral with the seat-bottom frame.

9. The seat of claim 1, wherein the first and second wedges are welded to the seat-bottom frame.

10. The seat of claim 1, wherein the first and second wedge are fixed relative to the seat-back frame.

11. The seat of claim 1, further comprising a plurality of upholstery panels covering the seat-back frame and the seat-bottom frame, wherein the upholstery panels conceal the first and second wedges.

12. The seat of claim 11, further comprising cushioning extending between the upholstery panels and first and second wedges.

13. The seat of claim 1, wherein the second wedge is fixedly attached to the seat-track bracket.

14. The seat of claim 1, wherein the seatpan is adjustable relative to the seat-track bracket.

15. The seat of claim 1, wherein the first wedge is fixedly attached to the seat-track bracket.

16. A seat comprising:
a seat-bottom frame;
a seat-back frame rotatable relative to the seat-bottom frame between a forward position and a rearward position; and
a first wedge and a second wedge on opposite sides of the seat-back frame, the first wedge extending from the seat-back frame in the forward position to the seat-bottom frame, and the second wedge extending from the seat-back frame in the rearward position to the seat-bottom frame;
wherein the seat-bottom frame includes a side beam elongated from the seat-back frame, and the first and second wedges are wider in a cross-seat direction than the side beam.

17. A seat comprising:
a seat-bottom frame;
a seat-back frame rotatable relative to the seat-bottom frame between a forward position and a rearward position; and
a first wedge and a second wedge on opposite sides of the seat-back frame, the first wedge extending from the seat-back frame in the forward position to the seat-bottom frame, and the second wedge extending from the seat-back frame in the rearward position to the seat-bottom frame;
wherein the seat-back frame includes a side beam elongated from the seat-bottom frame, and the first and second wedges are wider in a cross-seat direction than the side beam.

* * * * *